(12) United States Patent
Cociglio (10) Patent No.: US 10,027,567 B2
(45) Date of Patent: Jul. 17, 2018

(54) TIME MEASUREMENT IN A PACKET-SWITCHED COMMUNICATION NETWORK

(71) Applicant: TELECOM ITALIA S.p.A., Milan (IT)

(72) Inventor: Mauro Cociglio, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 88 days.

(21) Appl. No.: 15/102,444

(22) PCT Filed: Dec. 17, 2013

(86) PCT No.: PCT/EP2013/076892
§ 371 (c)(1),
(2) Date: Jun. 7, 2016

(87) PCT Pub. No.: WO2015/090364
PCT Pub. Date: Jun. 25, 2015

(65) Prior Publication Data
US 2017/0244623 A1 Aug. 24, 2017

(51) Int. Cl.
*H04L 12/26* (2006.01)
(52) U.S. Cl.
CPC ........ *H04L 43/0858* (2013.01); *H04L 43/022* (2013.01); *H04L 43/106* (2013.01); *H04L 43/087* (2013.01)
(58) Field of Classification Search
CPC . H04L 43/0858; H04L 43/022; H04L 43/106; H04L 43/087
See application file for complete search history.

(56) References Cited

U.S. PATENT DOCUMENTS

2009/0252115 A1* 10/2009 Breuer .............. H04W 36/0083
370/331
2012/0275333 A1 11/2012 Cociglio

FOREIGN PATENT DOCUMENTS

WO 2011/079857 A1 7/2011

OTHER PUBLICATIONS

Written Opinion of the International Searching Authority. [database online], [retreived on Oct. 26, 2017]. Retrieved from the PATENTSCOPE database from the World Intellectual Property Office using: <URL: https://patentscope.wipo.int/search/docservicepdf_pct/id00000033827255/WOSA/WO2015090364.pdf>, pp. 1-10.*

(Continued)

*Primary Examiner* — Omar J Ghowrwal
(74) *Attorney, Agent, or Firm* — Oblon, McClelland, Maier & Neustadt, L.L.P.

(57) ABSTRACT

It is disclosed a method for performing a time measurement on a packet flow transmitted through a communication network. The transmitting node divides the packets into first and second packets transmitted in alternating periods. At each period, transmitting node also marks each packet by setting a feature thereof to a first value indicating that the packet shall undergo time measurement or a second value indicating that the packet shall not undergo time measurement. The transmission times of two packets marked by the first value are reciprocally delayed by a predefined intertransmission time shorter than a period duration. For each packet marked by the first value, the transmitting node generates a transmission time stamp and the receiving node generates a reception time stamp. Then, after the end of each period, a time measurement is performed based on transmission and reception timestamps of packets marked by the first value transmitted during the preceding period.

14 Claims, 5 Drawing Sheets

(56) References Cited

OTHER PUBLICATIONS

International Search Report issued on Apr. 9, 2014 for PCT/EP2013/076892 filed on Dec. 17, 2013.
M. Chen, et al., "Coloring based IP Flow Performance Measurement Framework", Huawei Technologies, XP015092381, Feb. 25, 2013, (17 pages).
A. Capello, et al., "A packet based method for passive performance monitoring", Telecom Italia, XP015092173, Feb. 25, 2013, (22 pages).

* cited by examiner

TIME MEASUREMENT IN A PACKET-SWITCHED COMMUNICATION NETWORK

TECHNICAL FIELD

The present invention relates to the field of communication networks. In particular, the present invention relates to a method for performing a time measurement (in particular, a delay measurement and/or a jitter measurement) of a data flow (in particular, a packet flow) transmitted between two measurement points in a packet-switched communication network. Further, the present invention relates to nodes and computers for communication network configured to implement such a method, and to computer networks comprising such nodes and computers.

BACKGROUND ART

In a packet-switched communication network, data are transmitted in the form of packets that are routed from a source node to a destination node through possible intermediate nodes. Exemplary packet-switched networks are IP (Internet Protocol) networks, Ethernet networks and MPLS (Multi-Protocol Label Switching) networks.

Packets not always reach the destination node, i.e. they may be lost during transmission through the network. Loss of packets is due to different reasons. For instance, a node or link may fail, or packets may be discarded by a node due to a congestion of its ports. Besides, packets may be discarded by a node since they contain bit errors. In any case, when providing a service by transmitting data through a packet-switched network, the rate of packets lost during transmission affects the quality of service (QoS) of that service.

Besides, a packet is transmitted at a transmission time by the source node and is received at a reception time by the destination node. The time elapsing between transmission time and reception time is typically called "one-way delay". The one-way delay of a packet mainly depends on the number of possible intermediate nodes crossed by the packet from source to destination, the permanence time of the packet at each node and the propagation time along the links. Since the packets are routed hop-by-hop by each node, both the number of possible intermediate nodes crossed by packets and the permanence time of packets at each node are unpredictable. Accordingly, the one-way delay of a packet is almost unpredictable.

Besides, packets of a same packet flow may have different one-way delays. The difference between the one-way delays of two packets of a same data flow is termed "interarrival jitter" (or, briefly, "jitter").

When a communication service (in particular, a real-time voice or data service such as call, conference call, video conference, etc.) is provided by means of a packet-switched network, a measurement of packet loss, one-way delay and jitter affecting the packet flow carrying the service provides an indication of the quality of service (QoS) perceived by the end users of the service. Therefore, measuring packet loss, one-way delay and/or jitter of packet flows in a communication network is of particular interest for network operators.

WO 2010/072251 (in the name of the same Applicant) discloses a method for measuring data loss of a data flow transmitted through a communication network from a transmitting node to a receiving node. Before transmitting the data units of the data flow, the transmitting node marks each data unit for dividing the data flow in blocks. In particular, the transmitting node marks each data unit by setting a bit of its header to "1" or "0". The marking results in a sequence of blocks, where blocks of data units marked with "1" alternate in time with blocks of data units marked with "0". The blocks may have a same duration termed "block period" Tb (e.g. 5 minutes).

WO 2011/079857 (in the name of the same Applicant) discloses a method for performing a time measurement (in particular, for measuring one-way delay and/or jitter) on a data flow. According to WO 2011/079857, in addition to the above marking operation disclosed by WO 2010/072251, transmission and reception timestamps are generated at each block period, which indicate the times at which predetermined data units of the current block are transmitted and received. In particular, the transmitting node counts the packets being transmitted during the current block period and generates a transmission timestamp every X transmitted packets. The receiving node, similarly, counts the packets being received during the current block period and generates a reception timestamp every X received packets. At the subsequent block period, the transmission and reception timestamps are used for calculating the one-way delay and jitter affecting the predefined data units.

The Internet draft "Coloring based IP flow performance measurement framework, draft-chen-coloring-based-ipfpm-framework-01", Feb. 25, 2013 discloses to set an unused bit of the IP header to "color" the packets into different color blocks to enable packet loss and delay measurements. For delay measurements, within a time period a single packet is colored. The sender records the timestamp when the colored packet is transmitted, the receiver records the timestamp when detecting the colored packet. With the two timestamps, the packet delay is computed.

SUMMARY OF THE INVENTION

The Applicant has noticed that the delay and/or jitter measurements described by WO 2011/079857 provide valid results only for block periods during which neither packet loss nor reception sequence errors occurred, namely when all the packets transmitted during a certain block period are received in the same order according to which they were transmitted.

However, while packet loss affecting a block period may be detected (and the time measurements relating to that block period may accordingly be discarded as invalid), reception sequence errors may not be detected, since the receiving node bases identification of packets to be subjected to time measurement only on the packet count. Hence, in case a reception sequence error occurs in a block period during which no packet loss occurred, and the error involves a packet to be subjected to time measurement, the receiving node can not detect the error and, accordingly, can not realize that the time measurements relating to that block period are invalid.

On the other hand, the above cited Internet draft provides for identification of packets to be measured based on their color and, therefore, in principle it allows proper identification of the packets to be measured also in case of reception sequence errors involving such packets. However, also this technique exhibits some drawbacks.

Firstly, the sequence of packets to be measured has no discontinuities, because all the packets to be measured have a same color. Therefore, possible reception sequence errors involving two consecutive colored packets can not be detected. The resulting time measurement is accordingly invalid, but such invalidity can not be detected. Moreover, also all the subsequent time measurements are invalid as well, since the reception timestamp error introduced upon occurrence of the reception sequence error indefinitely propagates along the entire sequence of colored packets.

In order to avoid reception sequence errors in the sequence of colored packets, the coloring period (namely, the time lapsing between transmission of two consecutive colored packets) shall be rather long, for instance 1 minute or more. Since at the receiving node each colored packet is distinguished from the next colored one and the preceding colored one only on a time basis, this guarantees that the colored packet received during a certain coloring period is the expected one.

This way, however, a very reduced number of packets are colored and subjected to time measurement, and accordingly a very reduced number of time measurement samples is disadvantageously provided.

In view of the above, the Applicant has tackled the problem of providing a method for performing a time measurement on a packet flow transmitted between two measurement points (nodes or computers) in a packet-switched communication network, which overcomes the aforesaid drawbacks, namely which is immune from reception sequence errors and which provides an adequate number of time measurement samples.

In the following description and in the claims, the expression "performing a time measurement on a packet flow" will designate an operation of measuring:

a one-way delay or a two-way delay induced on packets of said packet flow by transmission between the two measurement points; and/or
   a jitter induced on a pair of packets of the packet flow by transmission between the two measurement points.

Besides, in the following description and in the claims, the expression "marking a packet" will designate an operation of setting at least one feature of the packet to a predefined marking value, in particular to one of at least two alternative marking values. For instance, the operation of marking a packet may comprise the operation of setting one or more bits of the packet (e.g. one bit or a bit sequence of its header) to one of at least two predefined alternative marking values, the operation of setting its frequency or its phase to one of at least two predefined alternative marking values, and so on.

According to embodiments of the present invention, the above problem is solved by a method for performing a time measurement on a packet flow transmitted through a communication network, wherein the transmitting node, while transmitting the packets, splits them into first and second packets transmitted in alternating periods. At each period, the transmitting node also marks each packet by setting a feature thereof to a first value indicating that the packet shall undergo time measurement or a second value indicating that the packet shall not undergo time measurement. The marking is performed so that the transmission times of two packets marked by the first value are reciprocally delayed by a predefined inter-transmission time shorter than a period duration. For each packet marked by the first value, the transmitting node generates a transmission timestamp and the receiving node generates a reception timestamp. Then, after the end of each period, a time measurement is performed based on transmission and reception timestamps of packets marked by the first value transmitted during the preceding period.

According to a first aspect, the present invention provides a method for performing a time measurement on a packet flow transmitted through a communication network from a first measurement point to a second measurement point, the method comprising:

a) at the first measurement point, while the packet flow is transmitted, dividing the packet flow into first packets transmitted during first periods and second packets transmitted during second periods which alternate in time with the first periods;

b) during a certain period, while the first packets are transmitted, at the first measurement point marking the first packets by setting a feature of each one of the first packets to either a first marking value indicating a first packet to be subjected to time measurement or a second marking value indicating a first packet not to be subjected to time measurement, the marking being performed so that transmission times of two first packets marked by the first marking value are reciprocally delayed by at least a predefined minimum inter-transmission time shorter than a duration of the period, and generating a transmission timestamp for each one of the first packets marked by the first marking value;

c) at the second measurement point, identifying the first packets marked by the first marking value and, for each one of the first packets marked by the first marking value, generating a reception timestamp;

d) after expiration of the period, performing the time measurement based on the transmission timestamps and the reception timestamps of the first packets marked by the first marking value.

According to preferred embodiments, step a) comprises marking the packets by setting a further feature of each one of the packets to either a third marking value indicating a first packet to be transmitted during the first periods or a fourth marking value indicating a second packet to be transmitted during the second periods.

Preferably, each packet of the packet flow comprises a marking field, the further feature being a first marking sub-field of the marking field and the feature being a second marking sub-field of the marking field.

Preferably, in step b) the minimum inter-transmission time is set to a value suitable for preventing reception sequence errors involving overtaking between the first packets marked by the first marking value.

According to some variants, the minimum inter-transmission time is longer than an average one-way delay of the packet flow from the first measurement point to the second measurement point.

According to other variants, the minimum inter-transmission time is longer than a maximum one-way delay of the packet flow from the first measurement point to the second measurement point.

Preferably, the minimum inter-transmission time is longer than or equal to 10 milliseconds.

Preferably, step b) comprises, upon transmission of each one of the first packets:

checking whether the certain period is one of the first periods or one of the second periods; and
   if the certain period is one of the first periods, increasing a transmission counter, checking whether the minimum inter-transmission time lapsed since transmission of the last packet marked by the first marking value and, in the affirmative, marking the first packet by the first marking value and setting one of a number N of transmission timestamp variables to a current time indicated by a local clock of the first measurement point.

Preferably, step d) comprises:

checking whether the period was one of the first periods or one of the second periods;

if the period was one of the first periods, using the transmission counter and the number N of transmission timestamp variables for performing the time measurement; and resetting the transmission counter and the number N of transmission timestamp variables.

Preferably, step c) comprises, upon reception of each packet:

checking whether the packet is one of the first packets or one of the second packets;

if the packet is one of the first packets, increasing a reception counter, checking whether the first packet is marked by the first value and, in the affirmative, setting one of a number N of reception timestamp variables to a current time indicated by a local clock of the second measurement point.

Preferably, step d) comprises:

checking whether the period was one of the first periods or one of the second periods;

if the period was one of the first periods, using the reception counter and the number N of reception timestamp variables for performing the time measurement; and resetting the reception counter and the number N of reception timestamp variables.

According to preferred embodiments, step d) is delayed, relative to the end of the period, by a predetermined wait time comprised between 1% and 50% of a duration of the period.

Preferably, step d) comprises calculating a one-way delay for each one of the first packets marked by the first marking value as a difference between transmission timestamp and reception timestamp generated at step c) for the first packet.

According to a second aspect, the present invention provides a node for a communication network, the node being configured to transmit a packet flow to a further node, the node being configured to:

a) while the packet flow is transmitted, divide the packet flow into first packets transmitted during first periods and second packets transmitted during second periods which alternate in time with the first periods;

b) during a certain period, while the first packets are transmitted, mark the first packets by setting a feature of each one of the first packets to either a first marking value indicating a first packet to be subjected to time measurement or a second marking value indicating a first packet not to be subjected to time measurement, the marking being performed so that transmission times of two first packets marked by the first marking value are reciprocally delayed by at least a predefined minimum inter-transmission time shorter than a duration of the period, and for each one of the first packets marked by the first marking value generating a transmission timestamp.

According to a third aspect, the present invention provides a node for a communication network, the node being configured to receive a packet flow from a further node, the packet flow comprising packets divided into first packets transmitted during first periods and second packets transmitted during second periods which alternate in time with the first periods, wherein each one of the packets comprises a feature set to either a first marking value indicating a first packet to be subjected to time measurement or a second marking value indicating a first packet not to be subjected to time measurement, the second node being configured to:

identify the first packets marked by the first marking value; and generate a reception timestamp for each one of the first packets marked by the first marking value.

According to a fourth aspect, the present invention provides a communication network comprising at least a first node according to second aspect of the present invention and a second node according to the third aspect of the present invention.

According to a fifth aspect, the present invention provides a computer program product loadable in the memory of at least one computer and including software code portions for performing the steps of the method as set forth above, when the product is run on at least one computer.

BRIEF DESCRIPTION OF THE DRAWINGS

The present invention will become clearer from the following detailed description, given by way of example and not of limitation, to be read with reference to the accompanying drawings, wherein.

DETAILED DESCRIPTION OF PREFERRED EMBODIMENTS OF THE INVENTION

Figure 1:
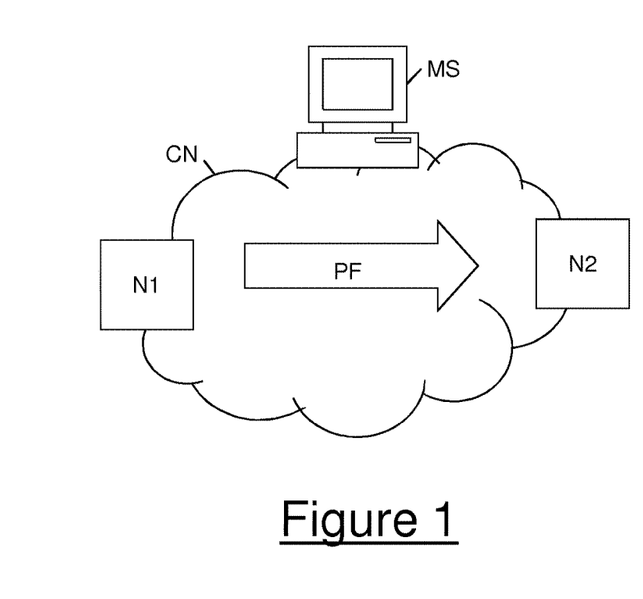
FIG. 1 schematically shows an exemplary packet-switched network.

FIG. 1 schematically shows an exemplary packet-switched communication network CN in which the method for performing a time measurement according to embodiments of the present invention may be implemented. The communication network CN may be an IP network, an Ethernet network, an MPLS network or any other known type of packet-switched communication network.

The communication network CN comprises a plurality of nodes reciprocally interconnected by links according to any known topology.

In particular, the communication network CN comprises a first node N1 and a second node N2. The first node N1 (also termed herein after "transmitting node") is configured to transmit a packet flow PF to the second node (also termed "receiving node"), possibly through intermediate nodes (not shown in FIG. 1) of the communication network CN. The transmitting node N1 may be either the source node of the packet flow PF or an intermediate node of the path from the source node to the destination node. Similarly, the receiving node N2 may be either the destination node of the packet flow PF or an intermediate node of the path from the source node to the destination node.

Preferably, the communication network CN is also suitable for cooperating with a management server MS. The management server MS may be either a stand-alone server connected to any of the nodes of the communication network CN. Alternatively, the management server MS may be implemented at any of the nodes of the communication network CN.

According to preferred embodiments of the present invention, the packet flow PF comprises a sequence of packets Pki.

Figure 2:
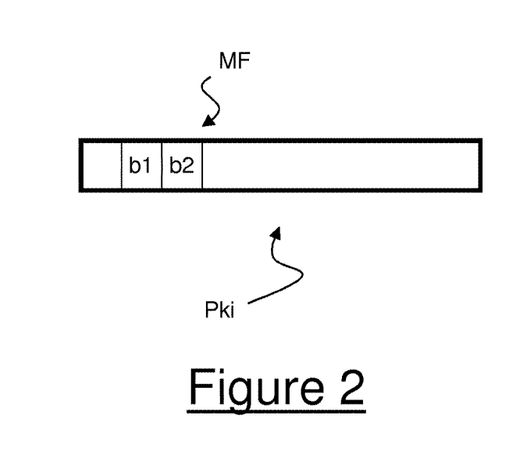
FIG. 2 schematically shows a packet's structure, according to an embodiment of the present invention.

Each packet Pki comprises a header and a payload. The payload comprises data to be transmitted. Besides, preferably, the header comprises information for routing the packet Pki, such as the source node address and the destination node address. Each packet Pki also preferably comprises a priority field. Preferably, all the packets Pki of the flow PF have a same priority.

The packet Pki further comprises a marking field MF, which comprises at least two sub-fields, e.g. two marking bits b1 and b2. Each marking sub-field b1, b2 may be set to either of two alternative marking values. In particular, the first marking sub-field b1 may be set to either of two alternative marking values Va, Vb, whereas the second marking sub-field b2 may be set to either of two alternative marking values Vc, Vd. The marking field MF is preferably comprised in the packet's header. The marking field MF may be for instance a field to which the protocol according to which the packet Pki is formatted has not assigned a specific function yet. Alternatively, the marking field MF may be comprised in a field having other uses. For instance, in case of IP packets, the marking field MF may comprise two bits of the 8-bit DS (Differentiated Service) field, each bit constituting one of the two marking sub-fields. In such case, the two alternative marking values Va and Vb of the bit b1 are 1 and 0, whereas the two alternative marking values Vc and Vd of the bit b2 are 1 and 0, respectively.

Optionally, the marking field MF may also comprise a filter sub-field (not shown in the drawing), which is set to either of two alternative values. The value of the filter sub-field in a packet Pki preferably indicates whether the packet Pki is a marked packet Pki (in which case, the values of the marking sub-field b1, b2 will be read and processed for packet loss and/or time measurement purposes) or not (in which case, the marking sub-field b1, b2 will be ignored). The filter sub-field is preferably prepended to the first marking sub-field b1.

The packets Pki are preferably marked upon their transmission by the transmitting node N1, which sets the value of the first marking sub-field b1 to Va or Vb and the value of the second marking sub-field b2 to Vc or Vd.

The transmitting node N1 in particular periodically changes the marking value Va, Vb assigned to the first marking sub-field b1 (for instance, 1 or 0) with a period Tb, which will be termed herein after "block period". This way, packets Pki marked during first block periods (also termed herein after "even block periods") are marked by a first marking value Va (e.g. 1) of the first marking sub-field b1, while packets Pki marked during second block periods (also termed herein after "odd block periods") which alternate in time with the first block periods are marked by a second marking value Vb (e.g. 0) of the first marking sub-field b1.

The block period Tb may be set by the network operator, according to the desired packet loss measurement rate (the block period Tb is also the measurement period for packet loss). For instance, the block period Tb may be equal to 5 minutes.

According to preferred embodiments of the present invention, within each even and odd block period T(k) (k=0, 1, 2, 3, etc.), the transmitting node N1 uses the marking values Vc, Vd of the second marking sub-field b2 (for instance, 1 or 0) for distinguishing packets to be subjected to time measurements from packets not to be subjected to time measurements. In particular, during each block period T(k) (k=0, 1, 2, 3, etc.), packets Pki to be subjected to time measurement are marked by a first marking value Vc (e.g. 1) of the second marking sub-field b2, while packets Pki not to be subjected to time measurement are marked by a second marking value Vd (e.g. 0) of the second marking sub-field b2.

During each block period T(k) (k=0, 1, 2, 3, etc.), two or more packets Pki are marked as packets to be subjected to time measurement. In particular, the transmitting node N1 determines the value Vc or Vd of the second marking sub-field b2 of each packet Pki applying the principle that the transmission times of two consecutive packets Pki transmitted during a same block period and being marked as packets to be subjected to time measurement shall be reciprocally delayed by at least a predefined minimum inter-transmission time Tx. The predefined minimum inter-transmission time Tx is shorter than the block period Tb and is selected so as to prevent reception sequence errors involving overtaking between packets to be subjected to time measurements, and depends on the feature of the link between the nodes N1 and N2, as it will be discussed in detail herein after.

During each block period T(k) (k=0, 1, 2, 3, etc.), for each packet Pki marked as a packet to be subjected to time measurement, at the transmitting side a transmission timestamp is generated, which indicates the time at which the packet Pki is transmitted by the transmitting node N1 and, similarly, at the receiving side a reception timestamp is generated, which indicates the time at which the packet Pki is received by the receiving node N2.

Then, after the end of each block period T(k), the transmission timestamps and reception timestamps relating to packets Pki to be subjected to time measurement which were transmitted and received during that block period T(k) are preferably used for performing time measurements, as it will be described in detail herein after.

Therefore, advantageously, packets Pki to be subjected to time measurement are identified by the value of the second marking sub-field b2, which allows the receiving node N2 to distinguish such packets from the other packets Pki of the packet flow PF which—while being involved in the packet loss measurement—shall not be subjected to time measurement. In other words, the second marking sub-field b2 allows creating, within the packet flow PF, a "sub-flow" of packets Pki to be subjected to time measurement, which may be unambiguously distinguished from the remainder of the packet flow PF by the receiving node N2.

Therefore, even if a reception sequence error occurs which involves an overtaking between a packet to be subjected to time measurement and one or more packets not to be subjected to time measurement, the receiving node N2 may anyway properly identify the packet to be subjected to time measurement and therefore generate the relevant reception timestamp in a proper way. The resulting time measurement based on that reception timestamp is accordingly a valid measurement. The time measurement is therefore advantageously immune from this type of reception sequence error.

On the other hand, a proper selection of the inter-transmission time Tx allows avoiding reception sequence errors involving overtaking between packets to be subjected to time measurement.

Furthermore, the first marking sub-field b1 advantageously introduces a periodic discontinuity in the "sub-flow" of packets Pki to be subjected to time measurement. In other words, similarly to the whole packet flow PF, also the "sub-flow" of packets to be subjected to time measurement is divided in alternating blocks of period Tb. Therefore, in case a packet loss and/or a reception sequence error occurs which invalidates the measurements relating to a certain block period T(k), such error is automatically reset at the end of the block period, since all the parameters (counters and timestamps) used for making the measurements are reset after the end of the block period, as it will be described in detail herein after.

Furthermore, for each block period T(k), several time measurement samples may be advantageously obtained, since transmission and reception timestamps (which will be used for making the time measurements) are generated for multiple packets during each block period. In particular, the maximum number of time measurement samples which in principle may be obtained in each block period T(k) is N=Tb/Tx, where Tb is the duration of each block period T(k) and Tx is the above mentioned minimum inter-transmission time, namely the minimum time that shall lapse between transmission of two packets Pki marked as packets to be subjected to time measurement.

As mentioned above, the minimum inter-transmission time Tx is preferably selected based on the performance of the link between the nodes N1 and N2. In particular, the minimum inter-transmission time Tx is preferably set so as to substantially prevent possible reception sequence errors involving overtaking between packets to be subjected time measurement.

For example, the minimum inter-transmission time Tx may be chosen higher than an average one-way delay between N1 and N2.

In particular, according to some embodiments, the minimum inter-transmission time is firstly set equal to an initial value Tx0, which shall be low enough for providing a sufficiently high number of time measurement samples within each block period, so as to make the average one-way delay measurement as realistic as possible. In such initial phase, only the average one-way delay measurement is made that, as it will be discussed in detail herein after, is inherently immune from reception sequence errors involving overtaking between packets to be subjected to time measurement. All the other measurements (e.g. maximum and minimum delay and jitter) are instead suspended, since they are not immune from this type of reception sequence error and, in such initial phase, the value of Tx0 may be too low to guarantee that such type of error does not occur.

Then, after the average one-way delay is measured (details on such kind of time measurement will be provided in the following description), the minimum inter-transmission time Tx is set higher than such value and the time measurements are started again. In this second phase, also those time measurements whose accuracy is impaired by possible overtaking between packets to be measured may be performed. The choice of the minimum inter-transmission time Tx indeed advantageously prevents such type of reception sequence error.

Alternatively, the minimum inter-transmission time Tx may be selected higher than a maximum one-way delay between N1 and N2.

In particular, according to other embodiments, the minimum inter-transmission time is firstly set equal to an initial value Tx0, which shall be high enough (e.g. several seconds) to guarantee that reception sequence errors involving overtaking between packets to be measured do not occur. This allows providing a reliable maximum one-way delay measurement that, as it will be discussed in detail herein after, is not immune from this type of reception sequence errors. In such initial phase, a very reduced number of time measurement samples is obtained, the number of packets Pki subjected to time measurement in each block period T(k) being very low. Hence, average time measurements (e.g. average one-way delay, average jitter, etc.) are preferably suspended in this phase.

Then, after the maximum one-way delay is measured (details on such kind of time measurement will be provided in the following description), the minimum inter-transmission time Tx is set higher than such value and the time measurements are started again. In this second phase, also the average time measurements may be performed, the number of samples being now high enough to provide realistic average values.

Since the average or maximum one-way delay of a link between two nodes typically is of some milliseconds, the minimum inter-transmission time Tx may be set equal to e.g. about 10 milliseconds. If the block period Tb is 5 minutes, the maximum number N of time measurement samples which may be provided during each block period T(k) is 30.000.

The method for performing time measurements according to the present invention will be now described in further detail.

Figure 3A:
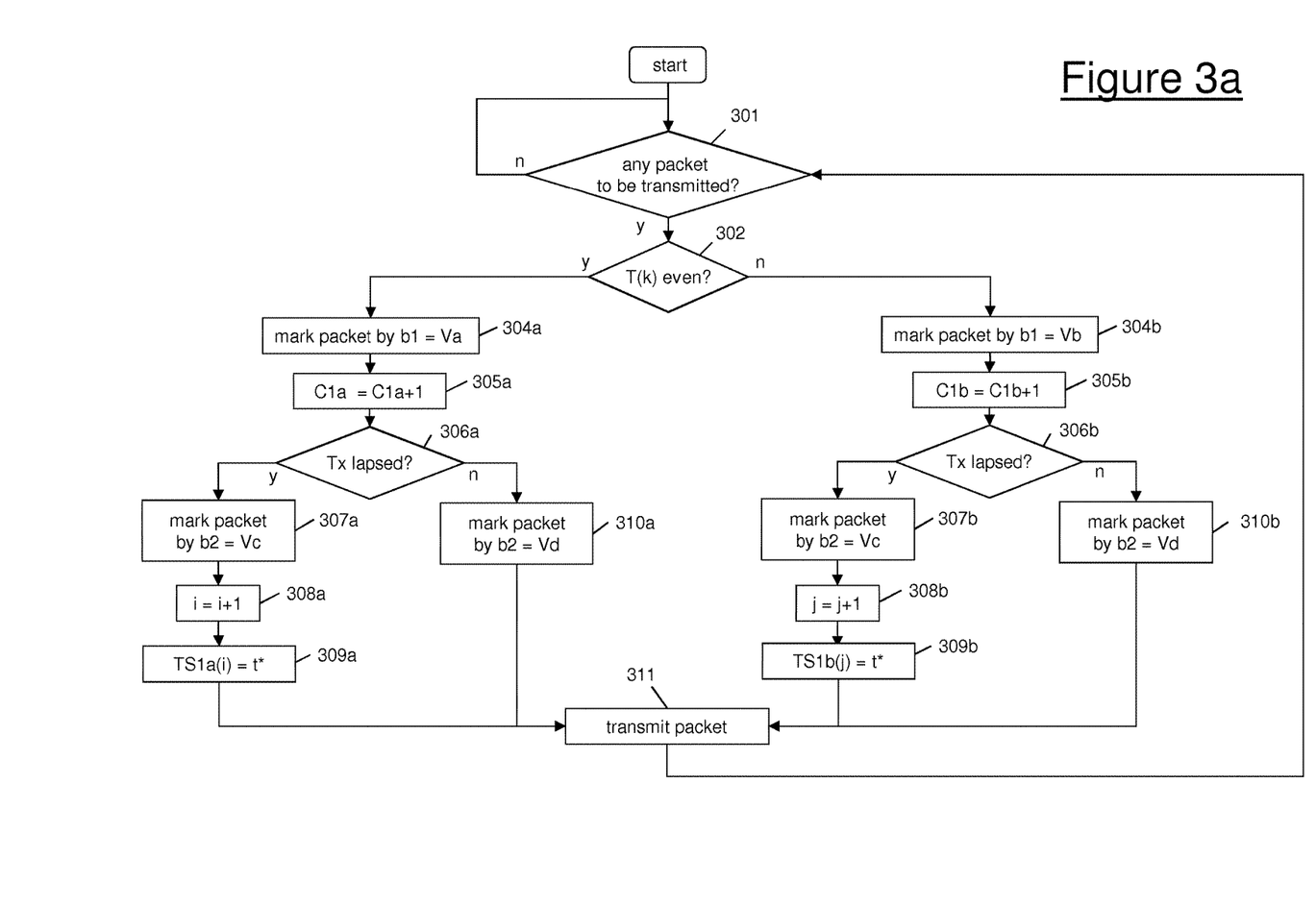
FIGS. 3a and 3b are flow charts of the method according to an embodiment of the present invention, at the transmitting side.

By referring first to FIG. 3a, at the transmitting side a number of variables is preferably provided: a first transmission counter C1a, an array of N first transmission timestamps TS1a(i), i=1, 2, . . . N, a first index i, a second transmission counter C1b, an array of N second transmission timestamps TS1b(j), j=1, 2, . . . N, and a second index j. The number N, as discussed above, is the maximum number of time measurement samples that in principle may be provided in each block period T(k), and is equal to Tb/Tx.

Then, the transmitting node N1 waits for possible packets Pki of the packet flow PF to be transmitted (step 301). The transmitting node N1 preferably identifies the packets Pki of the packet flow PF by using at least part of the destination address, at least part of the source address and, optionally, other fields of the packet header Hi (for instance, the field DSCP in case of IP packets).

When a packet Pki has to be transmitted, the transmitting node N1 preferably checks whether the current block period T(k) is an even block period or an odd block period (step 302), and accordingly determines the marking value Va (during even block periods) or Vb (during odd block periods) of the first marking sub-field b1 to be applied to the packet Pki.

In particular, if the current block period T(k) is an even block period, before transmitting the packet Pki, the node N1 preferably marks it (step 304a) by setting its first marking sub-field b1 to the marking value Va. If the packet Pki comprises also a filter sub-field (as mentioned above), at step 304a it is preferably set to the value indicating a marked packet.

Further, the first transmission counter C1a is preferably increased by 1 (step 305a).

Then, the node N1 preferably checks whether the minimum inter-transmission time Tx lapsed since transmission of the last packet whose second marking sub-field b2 was set to the value Vc, namely the value which identifies packets to be subjected to time measurement (step 306a).

In the affirmative, the node N1 preferably further marks the packet Pki by setting its second marking sub-field b2 to the marking value Vc (sub-step 307a), namely the marking value indicating packets to be measured. Further, the index i is preferably increased by 1 (step 308a) and then the $i^{th}$ element of the array of N first transmission timestamps TS1a(i) is set equal to the current time t* indicated by a local clock of the transmitting node N1 (step 309a).

If the minimum inter-transmission time Tx is not lapsed, the node N1 preferably further marks the packet Pki by setting its second marking sub-field b2 to the marking value Vd (sub-step 310a), namely the marking value indicating packets not to be subjected to time measurement.

The packet Pki is then transmitted to N2 (step 311).

If, at step 302, it is determined that the current block period T(k) is an odd block period, the transmitting node N1 marks the packet Pki by setting its first marking sub-field b1 to the marking value Vb (step 304b), then preferably performs steps 305b-310b to update the values of the second transmission counter C1b and the array of N second transmission timestamps TS1b(j) and finally transmits the packet Pki (step 311). Steps 305b-310b basically correspond to steps 305a-310a carried out if the current block period T(k) is an even block period. Hence, a detailed description of such steps will not be repeated.

The steps of the flow chart of FIG. 3a are preferably iterated each time the node N1 shall transmit a packet Pki of the packet flow PF.

Figure 3B:
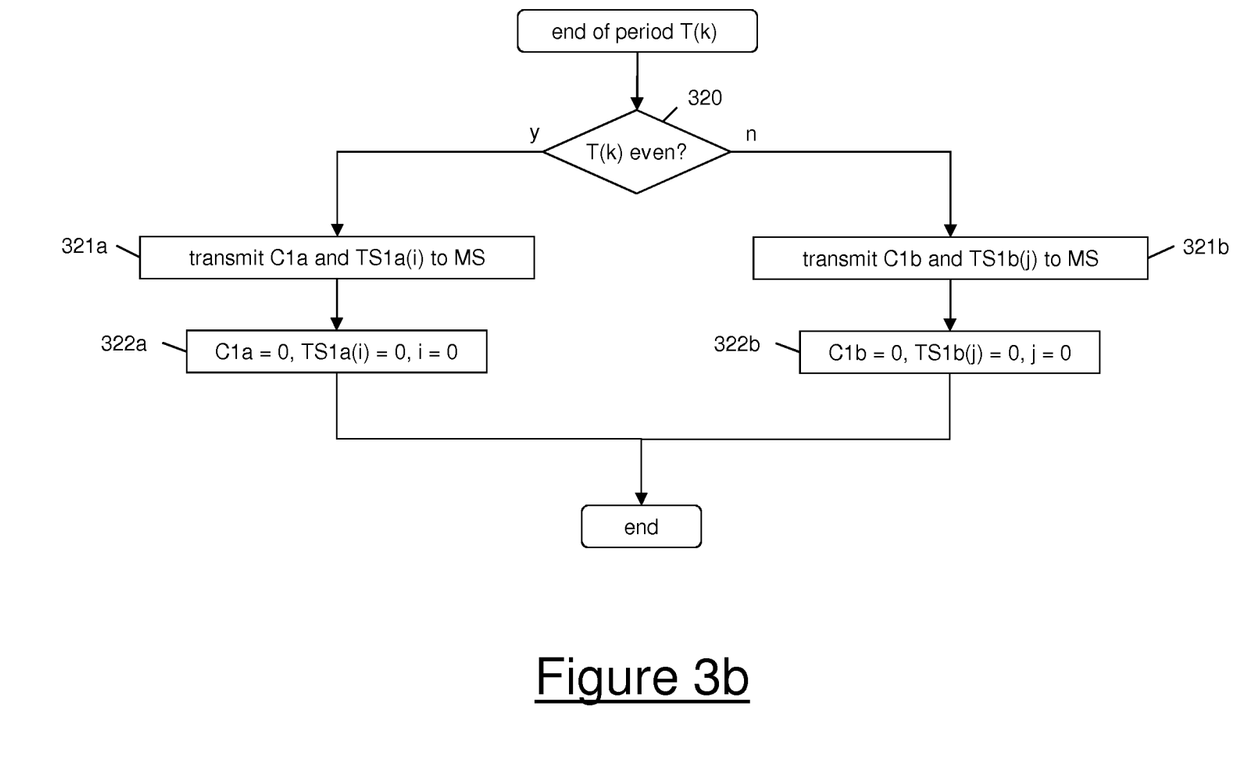

Referring now to FIG. 3b, at the end of each block period T(k), it is checked whether the block period T(k) just expired was an even or odd block period (step 320).

If the block period T(k) was an even block period, it is determined that the relevant variables for performing time measurements relating to the block period T(k) are those relating to transmitted packets marked by Va, namely C1a and TS1a(i).

Hence, the node N1 preferably transmits to the management serve MS the value of the first transmission counter C1a reached at the last iteration of step 305a and the array of N first transmission timestamps TS1a(i) as provided at the last iteration of step 309a (step 321a). The first transmission counter C1a, the array of N first transmission timestamps TS1a(i) and the index i are then preferably reset (step 322a).

Otherwise, if the block period T(k) was an odd block period, it is determined that the relevant variables for performing time measurements relating to the block period T(k) are those relating to packets marked by Vb, namely C1b and TS1b(j).

Hence, the node N1 preferably transmits to the management serve MS the value of the second transmission counter C1b reached at the last iteration of step 305b and the array of N second transmission timestamps TS1b(j) as provided at the last iteration of step 309b (step 321b). The second transmission counter C1b, the array of N second transmission timestamps TS1b(j) and the index j are then preferably reset (step 322b).

It shall be noticed that the real number N* of packets having their second marking sub-field b2 set to Vc transmitted during the block period T(k) may be lower than N, since it depends on the actual packet transmission rate of the packet flow PF during the block period T(k). In such case, only the first N* elements of the array TS1a(i) or TS1b(j) comprise significant timestamp values, the remainder of the array comprising the initialization values (namely, zeros).

Steps 321a and 321b may be performed e.g. by establishing a communication session between the transmitting node N1 and the management server MS based on a known communication protocol, for instance FTP (File Transfer Protocol). The communication session may be started either by the transmitting node N1 or the management server MS.

Further, steps 321a and 321b are preferably performed at a random instant comprised between the end of the block period T(k) and the end of the subsequent block period T(k+1), for reasons that will be described in detail herein after.

Figure 4A:
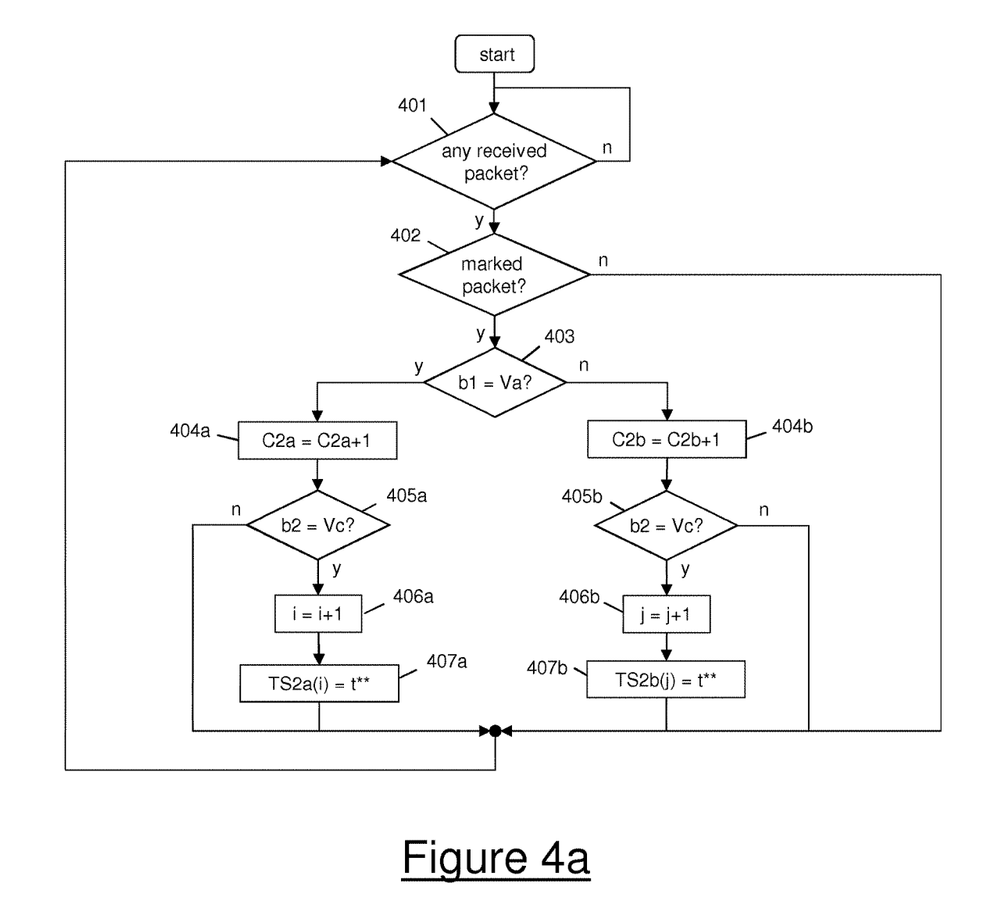
FIGS. 4a and 4b are flow charts of the method according to an embodiment of the present invention, at the receiving side.

By referring now to FIG. 4a, at the receiving side a number of variables is preferably provided: a first reception counter C2a, an array of N first reception timestamps TS2a(i), i=1, 2, ... N, a first index i, a second reception counter C2b, an array of N second reception timestamps TS2b(j), j=1, 2, ... N, and a second index j. The number N is preferably the same as for the transmission side, namely it is preferably equal to Tb/Tx.

Then, the receiving node N2 waits for possible packets Pki of the packet flow PF (step 401). Similarly to node N1, also the receiving node N2 preferably identifies the packets Pki of the packet flow PF by using at least part of their destination address, at least part of their source address and, optionally, other fields of the packet header Hi (for instance, the field DSCP in case of IP packets).

Upon reception of a packet Pki of the packet flow PF, it is preferably checked whether the packet Pki is a marked packet (step 402). To this purpose, it is preferably checked the value of the filter sub-field included in the marking field MF of the packet Pki. If it is determined that the packet Pki is not marked, no other operations are carried out to packet loss and/or time measurement purposes.

Otherwise, if the packet Pki is a marked packet, the value of the first marking sub-field b1 of the received packet Pki is preferably checked (step 403).

If the value of the first marking sub-field b1 of the received packet Pki is equal to Va, the first reception counter C2a is preferably increased by 1 (step 404a).

Then, the value of the second marking sub-field b2 of the received packet Pki is preferably checked (step 405a). If the value of the second marking sub-field b2 is equal to Vc (which identifies packets to be measured), the index i is preferably increased by 1 (step 406a) and the $i^{th}$ element of the array of N first reception timestamps TS2a(i) is set equal to the current time t** indicated by a local clock of the receiving node N2 (step 407a). Otherwise, if the value of the second marking sub-field b2 is equal to Vd (which identifies packets not to be measured), no other actions are performed.

If, at step 403, it is determined that the value of the first marking sub-field b1 of the received packet Pki is equal to Vb, the second reception counter C2b is preferably increased by 1 (step 404b).

Then, the value of the second marking sub-field b2 of the received packet Pki is preferably checked (step 405b). If the value of the second marking sub-field b2 is equal to Vc (which identifies packets to be measured), the index j is preferably increased by 1 (step 406b) and the $j^{th}$ element of the array of N first reception timestamps TS2b(j) is set equal to the current time t** indicated by a local clock of the receiving node N2 (step 407b). Otherwise, if the value of the second marking sub-field b2 is equal to Vd (which identifies packets not to be measured), no other actions are performed.

Steps 402 to 407a/407b are preferably iterated each time a packet Pki of the packet flow PF is received.

Figure 4B:
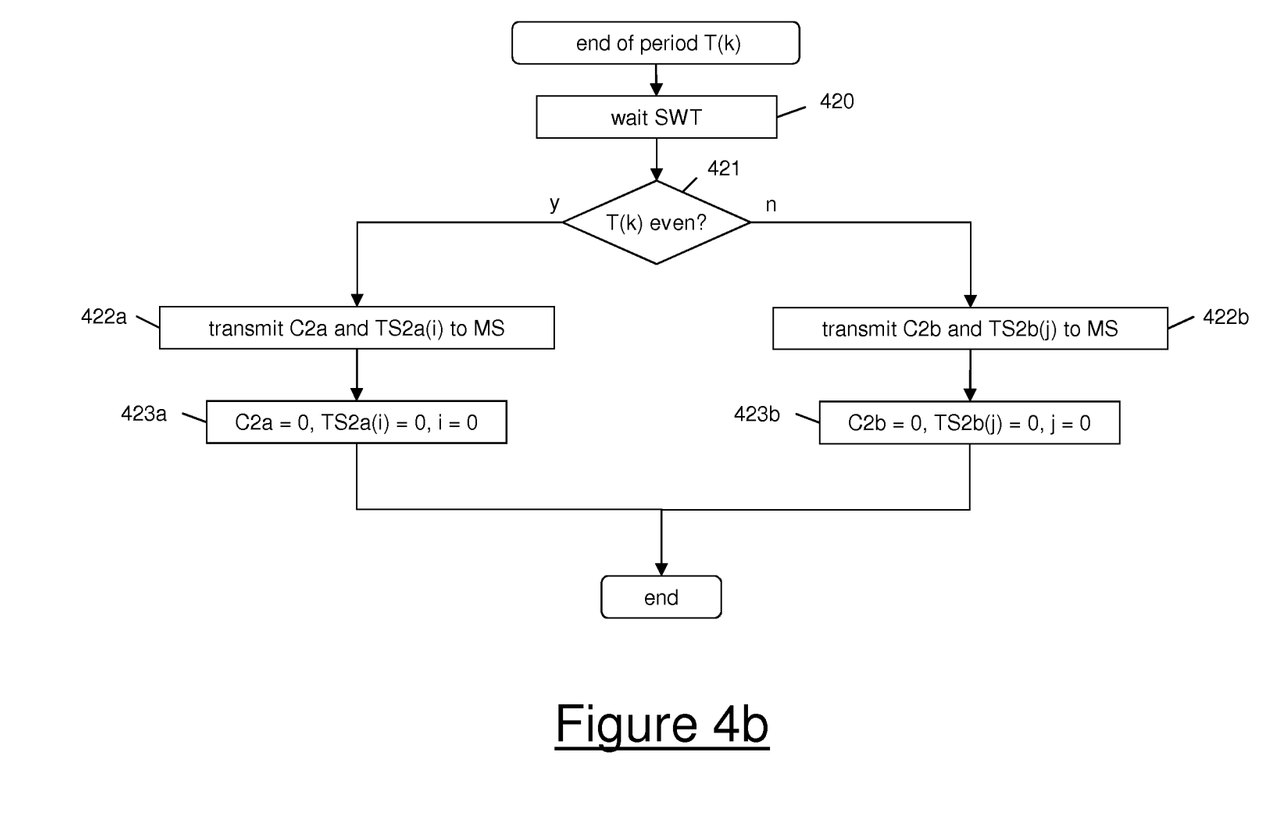

Referring now to FIG. 4b, at the end of each block period T(k), after a safety wait time SWT has lapsed (step 420), it is determined whether the block period T(k) just expired was an even or odd block period (step 421) If the block period T(k) was an even block period, it is determined that the relevant variables for performing time measurements relating to the block period T(k) are those relating to received packets marked by Va, namely C2a and TS2a(i).

Hence, the node N2 preferably transmits to the management serve MS the value of the first reception counter C2a reached at the last iteration of step 404a and the array of N first reception timestamps TS2a(i) as provided at the last iteration of step 407a (step 422a). The first reception counter C2a, the array of N first reception timestamps TS2a(i) and the index i are then preferably reset (step 423a).

Otherwise, if the block period T(k) was an odd block period, it is determined that the relevant variables for performing time measurements relating to the block period T(k) are those relating to packets marked by Vb, namely C2b and TS2b(j).

Hence, the node N2 preferably transmits to the management serve MS the value of the second reception counter C2b reached at the last iteration of step 404b and the array of N second reception timestamps TS2b(j) as provided at the last iteration of step 407b (step 422b). The second reception counter C2b, the array of N second reception timestamps TS2b(j) and the index j are then preferably reset (step 423b).

It shall be noticed that the number N** of packets having their second marking sub-field b2 set to Vc received during the block period T(k) may be lower than N (and also than N*), since it depends on the actual packet transmission rate of the packet flow PF during the block period T(k) and also on the packet loss during the block period T(k). In such case, only the first N** elements of the array TS2a(i) or TS2b(j) comprise significant timestamp values, the remainder of the array comprising the initialization values (namely, zeros).

As mentioned above, the steps of the flow chart of FIG. 4b are preferably delayed by a safety wait time SWT relative to the end of the block period T(k). Indeed, due to the propagation delay of the packets Pki through the communication network CN or to a reception sequence error, the last packets Pki marked by Va and transmitted during an even block period T(k) may be received by the receiving node N2 at the beginning of the subsequent odd block period T(k+1). Hence, after the end of an even block period T(k), the variables relating to received packets marked by Va (namely C2a and TS2a(i)) may still be varying. Similarly, the last packets marked by Vb and transmitted during an odd block period T(k) may be received by the receiving node N2 at the beginning of the subsequent even block period T(k+1). Hence, after the end of an odd block period T(k), the variables relating to received packets marked by Vb (namely C2b and TS2b(j)) may still be varying.

The safety wait time SWT guarantees that the variables relating to packets marked by Va or Vb are transmitted to the management server MS only when their values are stabilized. This also makes the packet loss and time measurements based on such variables immune from reception sequence errors occurring at the edge between consecutive block periods. The safety wait time SWT is preferably comprised between 1 and 50% of the block period Tb. For instance, if the block period Tb is equal to 5 minutes, the safety wait time SWT may be equal to 20% Tb, namely 1 minute.

Steps 422a and 422b may be performed e.g. by establishing a communication session between the receiving node N2 and the management server MS based on a known communication protocol, for instance FTP (File Transfer Protocol). The communication session may be started either by the receiving node N2 or the management server MS.

Further, steps 422a and 422b are preferably performed at a random instant comprised between the end of the safety wait time SWT and the end of the block period T(k+1). This advantageously prevents the management server MS from receiving at the same time the parameters relating to all the nodes of the communication network CN, which may induce a congestion of the management server MS. The time lapsing between the end of the safety wait time SWT and the instant at which steps 422a and 422b are carried out is preferably comprised between 1% and 40% Tb. For instance, if the block period Tb is 5 minutes, it may be 20%, i.e. 1 minute.

Hence, after expiration of each block period T(k), the management server MS receives:
- a transmission counter $C1(k)$ equal to Ca1 or C1b and the array of N transmission timestamps $TS1a(l, k)$ equal to $TS1a(i)$ (or $TS1b(j)$) from the transmitting node N1; and
- the reception counter $C2(k)$ equal to C2a or C2b and the array of N reception timestamps $TS2(l, k)$ equal to $TS2a(i)$ or $TS2b(j)$ from the receiving node N2.

After expiration of each block period T(k), the management server MS may then calculate a packet loss PL(k) relating to that block period T(k), as a difference between transmission counter $C1(k)$ and reception counter $C2(k)$. Such packet loss measurement is advantageously immune from reception sequence errors involving indifferently packets to be subjected to time measurement and/or packets not to be subjected to time measurement.

Further, after expiration of each block period T(k), the management server MS may calculate the one-way delays $OWD(l, k)$ of the one at most N packets transmitted during the block period T(k) and having their second marking sub-field b2 equal to Vc. For each one of these packets, the one-way delay $OWD(l, k)$ is calculated as a difference between the $l^{th}$ element of the array of reception timestamps $TS2(l, k)$ and the corresponding $l^{th}$ element of the array of transmission timestamps $TS1(l, k)$. Once the one-way delays $OWD(l, k)$ have been calculated, a minimum one-way delay OWDmin(k) and a maximum one-way delay OWDmax(k) for the block period T(k) may be calculated as the minimum and maximum amongst such one-way delays $OWD(l, k)$.

Further, once the one-way delays $OWD(l, k)$ for a block period T(k) have been calculated, the management server MS may calculate a jitter $J(l, k)$ for each pair of consecutive packets transmitted during the block period T(k) and having their second marking sub-field b2 equal to Vc, as a difference between their one-way delays $OWD(l\ k)$.

Once the jitters $J(l, k)$ have been calculated for a block period T(k), a minimum jitter Jmin(k) (negative) and a maximum jitter Jmax(k) (positive) for the block period T(k) may be calculated as the minimum and maximum amongst those jitters $J(l, k)$.

Such one-way delay and jitter measurements (with the related maximum and minimum measurements) provide however valid results only when there is no packet loss, or at least no packet loss involving the packets having their second marking sub-field b2 equal to Vc, namely packets to be subjected to time measurements. Indeed, if one or more packets to be measured are lost during the block period T(k), a mismatch is introduced in the arrays of transmission timestamps $TS1(l, k)$ reception timestamps $TS2(l, k)$ for that block period T(k), since N** is lower than N*. This alters the results of the one-way delay measurement for all the packets subsequent to the lost one and all the time measurements derived therefrom, since for such packets the reception timestamp is compared with the transmission timestamp of another packet. Such time measurements are then preferably discarded when a packet loss is detected. Preferably, for detecting packet loss involving packets to be subjected to time measurements, the transmission counters C1a and C1b are increased by one only upon transmission of packets Pki marked by Vc (and not upon transmission of each packet Pki, as shown in FIG. 3a) and, similarly, the reception counters C2a and C2b are increased by one only upon reception of packets Pki marked by Vc (and not upon reception of each packet Pki, as shown in FIG. 4a). Then, after expiration of each block period, a packet loss relating to packets Pki marked by Vc is preferably calculated as a difference between transmission timestamp C1a or C1b and reception timestamp C2a or C2b. If the packet loss relating to a period T(k) is different from zero, the one-way delay and jitter measurements (with the related maximum and minimum measurements) relating to that period are preferably discarded as being invalid. According to some variants, the packet loss measurement only on packets marked as to be measured is carried out in addition to the packet loss measurement on the whole packet flow PF. In such case, two separate sets of transmission counters and reception counters shall be implemented, namely a first set of transmission and reception counters for counting all the packets Pki transmitted and received during each block period, and a second set of transmission and reception counters for counting only packets marked as packets to be subjected to time measurements. While the packet loss calculated using the first set of counters (namely, on the whole packet flow PF) is indicative of the behaviour of the packet flow PF, the packet loss calculated using the second set of counters (namely, only on packets Pki marked as packets to be measured) is preferably used only for validating/invalidating the time measurements.

For similar reasons, also reception sequence errors occurring in a block period T(k) and involving overtaking between packets to be subjected to time measurement impair the accuracy of the one-way delay measurement as described above. Such errors, differently from packet loss, may not be detected. However, the above-described choice of the minimum inter-transmission time Tx advantageously allows avoiding this type of reception sequence error.

After expiration of each block period T(k), the management server MS may also calculate an average one-way delay OWDav(k) for that block period T(k). To this purpose, the management server MS may calculate the one-way delays OWD(l, k) of the packets transmitted during the block period T(k) and having their second marking sub-field b2 equal to Vc, as described above, and then calculating an average. Alternatively, management server MS may firstly calculate an average transmission timestamp TS1av(k) as:

$$TS1av(k) = \frac{\sum_{l=1}^{N^*} TS1(l, k)}{N^*}, \quad [1]$$

then an average reception timestamp TS2av(k) as:

$$TS2av(k) = \frac{\sum_{l=1}^{N^{}} TS2(l, k)}{N^{}}, \quad [2]$$

and then calculate the average one-way delay OWDav(k) as a difference between average reception timestamp TS2av(k) and average transmission timestamp TS1av(k). According to particularly advantageous variants, the transmitting and receiving nodes N1 and N2 themselves preferably calculate the average transmission timestamp TS1av(k) and average reception timestamp TS2av(k), respectively, and send them to the management server MS, which merely has to calculate the difference between those two received parameters.

Optionally, the transmitting node N1 and the receiving node N2 may also calculate an average transmission time-stamp and an average reception timestamp relating to all the marked packets Pki transmitted during the block period T(k), independently of the value of their second marking sub-field b2. This allows the management server MS to calculate, in addition to the average one-way delay OWDav on the sub-flow of packets Pki marked by Vc, an average one-way delay of the whole packet flow PF.

Besides, the management server MS may also calculate an average jitter Jav(k) relating to the block period T(k). To this purpose, the management server MS preferably calculates an average one point transmission jitter OPJ1av(k) as:

$$OPJ1av(k) = \frac{\sum_{l=1}^{N^*-1} TS1(l+1, k) - TS1(l, k)}{N^* - 1} = \frac{TS1(N^*, k) - TS1(1, k)}{N^* - 1} \quad [3]$$

then an average one point reception jitter OPJ2av(k) as:

$$OPJ2av(k) = \frac{\sum_{l=1}^{N^{}-1} TS2(l+1, k) - TS2(l, k)}{N^{} - 1} = \frac{TS2(N^{}, k) - TS2(1, k)}{N^{} - 1} \quad [4]$$

and then calculate the average jitter Jav(k) as a difference between average one point reception jitter OPJ2av(k) and average one point transmission jitter OPJ1av(k). According to particularly advantageous variants, the transmitting and receiving nodes N1 and N2 themselves preferably calculate the average one point transmission jitter OPJ1av(k) and average one point reception jitter OPJ2av(k) relating to the block period T(k), respectively, and send them to the management server MS, which merely has to calculate the difference between those two received parameters.

Optionally, the transmitting node N1 and the receiving node N2 may also calculate an average one point transmission jitter and an average one point reception jitter relating to all the marked packets Pki transmitted during the block period T(k), independently of the value of their second marking sub-field b2. This allows the management server MS to calculate, in addition to the average jitter Jav(k) on the sub-flow of packets Pki marked by Vc, an average jitter of the whole packet flow PF.

The average one-way delay OWDav(k) and average jitter Jav(k) calculated for a block period T(k) as described above are advantageously resistant against possible packet loss occurring during the block period T(k), in particular against packet loss affecting packets to be subjected to time measurement. Indeed, in case one or more of such packets are lost before they are received at the receiving node N2, this slightly affects the accuracy of the medium delay OWDav(k) and average jitter Jav(k), because the two average timestamps TS1av(k) and TS2av(k), as well as the two average one point jitters OPJ1av(k) and OPJ2av(k), are calculated on different packet counts N*, N**.

Furthermore, the average one-way delay OWDav(k) and average jitter Jav(k) calculated as described above are resistant against possible reception sequence errors occurring during the block period T(k) and involving an overtaking between packets subjected to time measurement. Indeed, if the order in which packets marked by Vc are received at the receiving node N2 is different from the order in which they were transmitted by the transmitting node N1, the value of the average reception timestamp TS2av(k) and average one point reception jitter OPJ2av(k) does not change (in the case of jitter, it changes only if the error involves either the first packet or the last packet to be measured transmitted during the block period T(k)). This happens also if, due to a reception sequence error, some packets transmitted during a block period are received during the subsequent block period, as discussed above with reference to the flow chart of FIG. 4b.

In the above description, reference has been made only to one-way measurements, namely to measurements relating to a packet flow transmitted from node N1 to node N2. Such measurements provide accurate results only in case the nodes N1, N2 are synchronized, namely if their local clocks indicate the same date and time. However, in many applications, the nodes N1 and N2 are not synchronized. In such scenarios, the one-way measurements (in particular, the one-way delay measurements) may be inaccurate, since an unpredictably offset exists between transmission timestamps and reception timestamps.

Therefore, preferably, if the nodes N1 and N2 are not synchronized, the transmission and reception parameters provided by the nodes N1 and N2 are used for providing two-way measurements, in particular two-way delay measurements, which "emulate" a round-trip delay measurement.

In particular, according to such embodiments, besides processing the received packets Pki of the packet flow PF as described above with reference to the flow charts of FIGS. 4a and 4b, the second node N2 also preferably processes a further packet flow PF' of packets Pki' transmitted from N2 to N1 so as to provide, after expiration of each block period T(k), a transmission counter C1(k)' and an array of N' transmission timestamps TS1'(l, k) relating to the packet flow PF'. The number N' (namely, the maximum number of packets of the flow PF' to be subjected to time measurements within each block period) in general may be different from N (namely, the maximum number of packets of the flow PF to be subjected to time measurements within each block period), because the minimum inter-transmission time Tx' for time measurements in the direction from N2 to N1 may be a priori different from the minimum inter-transmission time Tx for time measurements in the direction from N1 to N2.

For providing transmission counter C1(k)' and array of N' transmission timestamps TS1'(l, k) after expiration of each block period T(k), the second node N2 basically applies the steps shown in FIGS. 3a and 3b to the packets Pki' of the packet flow PF'.

Similarly, besides processing the transmitted packets Pki of the packet flow PF as described above with reference to the flow charts of FIGS. 3a and 3b, the first node N1 also preferably processes the packets Pki' of the further packet flow PF' received from the second node N2 so as to provide, after expiration of each block period T(k), a reception counter C2(k)' and an array of N' reception timestamps TS2'(l, k) relating to the packet flow PF'. To this purpose, the first node N1 basically applies the steps shown in FIGS. 4a and 4b to the packet flow PF'.

Then, after expiration of each block period T(k), the nodes N1 and N2, besides transmitting to the management server MS the values of counters and timestamps relating to the packet flow PF, also transmit the values of counters and timestamps relating to the packet flow PF'.

Then, the received timestamps are preferably used for performing two-way delay measurements.

In particular, an average two-way delay TWDav(k) is preferably calculated as a sum of the average one-way delay OWDav(k) of the packet flow PF calculated as described above and an average one-way delay OWDav'(k) of the packet flow PE calculated in a similar way using the parameters relating to the packet flow PE. If average one-way delays have been calculated on the whole packet flows PF and PE (namely, with not distinction between packets marked by Vc and packets marked by Vd), an average two-way delay relating to the whole traffic may be also calculated.

Such average two-way delay TWDav(k) actually is an estimate of a round trip delay, since it is not measured on a same packet transmitted back and forth between N1 and N2. However, it is a quite accurate estimate, since it is calculated as an average on a high number of packets of two counter-propagating packet flows. The inventors have estimated that the accuracy of the average two-way delay TWDav(k) calculated as described above is comparable with the accuracy of the round-trip delay calculated with a ping function. However, advantageously, differently from the ping function, the calculation of the medium round-trip delay is performed on real traffic and does not require the transmission of any artificial packet.

Then, a maximum two-way delay TWDmax(k) and a minimum two-way delay TWDmin(k) are preferably calculated. To this purpose, the one-way delays OWD(l, k) of the packets of the packet flow PF marked by Vc are calculated as described above. Besides, one-way delays OWD'(l, k) of the packets of the packet flow PF' marked by Vc are calculated in a similar way. Then, two-way delays TWD(l, k) are calculated, each two-way delay TWD(l, k) being a sum of the one-way delay OWD(l, k) relating to a certain packet Pki of the packet flow PF and the one-way delay OWD'(l, k) of a corresponding packet Pki' of the packet flow PF'. Preferably, the corresponding packet Pki' is selected as the one whose transmission timestamp is the closest to the reception time of the packet Pki amongst all the packets of the packet flow PF' transmitted during the block period T(k) and marked by Vc.

It shall be noticed that, since the number of packets Pki of the packet flow PF transmitted during a certain block period is a priori different from the number of packets Pki' of the packet flow PF' transmitted during the same block period (and, in particular, the number of packets marked by Vc may be different in the two flows), the number of transmission and reception timestamps available at the end of a certain block period T(k) for making two-way time measurements may be not the same for the two flows PF and PF'. In particular, the number of one-way delays OWD(l, k) and OWD'(l, k) available for making two-way delay measurement may be not the same for the two flows PF and PF'. Therefore, in order to properly combine one-way delays for calculating to-way delays, it is preferred starting from the packet flow PF or PF' having the lowest number of Vc-marked packets for which timestamps have been generated and one-way delay calculated. Assuming e.g. that the packet rate of the packet flow PF' during a certain block period T(k) was lower than the packet rate of the packet flow PF, a higher number of transmission and reception timestamps (and therefore of calculated one-way delays OWD(l, k)) will be available for the packet flow PF. In such case, it is preferred starting from the array of one-way delays OWD'(l, k) calculated for the packet flow PF'. In particular, for each calculated one-way delay OWD'(l, k), a corresponding two-way delay TWD(l, k) is calculated by adding the one-way delay OWD(l, k) of the packet Pki of the packet flow PF whose transmission time is the closest to the reception time of that packet. According to a particularly preferred variant, a threshold is preferably fixed, which shall not be overcome by the difference between reception timestamp and transmission timestamp of the matched packets. This prevents possible drifts of the local clocks of the nodes N1 and N2 from increasing the error. If the difference between reception timestamp and transmission timestamp of the matched packets overcomes the threshold, the two-way delay calculated for those matched packets is preferably discarded.

Once the two-way delays TWD(l, k) have been calculated for each pair of matched packets of the counter-propagating packet flows PF, PF', other two-way measurements may be performed.

For instance, a maximum two-way delay TWDmax(k), a minimum two-way delay TWDmin(k) and an average two-way delay TWDav(k) may be calculated as the maximum, minimum and average of the calculated two-way delays TWD(l, k).

In addition, according to preferred variants, the percentage of packets whose two-way delay TWD(l, k) is below a certain value (which may be defined for instance by a SLA) may be estimated.

The time measurement method described above comprises periodically changing the value of the first marking sub-field b1 for dividing the packet flow PF in blocks. This is however not limiting. Indeed, according to alternative embodiments of the present invention, the packet flow PF may be divided in blocks without the first marking sub-field b1. In particular, according to a preferred embodiment, the transmitting node N1 may periodically insert in the packet flow PF an additional packet which marks the edge between a block period T(k) and the subsequent block period T(k+1). For instance, if the communication network CN is an Ethernet network, the additional packets may be OAM frames which, as defined by the ITU-T Recommendation Y.1731 (02/2008), Chapter 8.1 (pages 25-27), are currently used for allowing measurement of the frame loss. According to such embodiments, packet loss is preferably calculated on the packet flow divided in blocks as provided by Y.1731. However, differently from Y.1731, the time measurements are not performed on the OAM packets dividing the packet flow in blocks. According to such embodiments, the packets of the packet flow divided in blocks are marked for distinguishing packets to be subjected to time measurement from packets not to be subjected to time measurement, as described above. Then, time measurements are carried out on packets marked as packets to be subjected to time measurement. Hence, while according to Y.1731 packet loss is measured on real traffic while time measurements are made on artificial traffic (namely, the OAM packets which divide the real traffic into blocks), according to the present invention both packet loss measurements and time measurements are performed on real traffic.

In general, in the time measurement method of the present invention, the packet flow PF may be divided in blocks by any technique, provided such technique allows identification of even block periods and odd block periods alternating in time. This allows implementing a double set of variables (counters and timestamps) relating to packets transmitted during even and odd block periods. This way, at each block period, one set of variables is varying (steps of FIGS. 3a and 4a) while the other set of variables has fixed value and may accordingly be used (steps of FIGS. 3b and 4b) for performing the packet loss and time measurements as described above.

In the above description, it has been assumed that all the steps of the flow charts of FIGS. 3a, 3b are carried out at the transmitting node N1, whereas all the steps of the flow charts of FIGS. 4a, 4b are carried out at the receiving node N2. This is however not limiting. Indeed, in some cases it may be undesirable or even impossible to implement the method for performing a time measurement at the nodes. This is the case, for instance, when the nodes of the communication network do not comprise the basic functionalities required to support the execution of the method steps, or when the nodes are of different vendors and, accordingly, their reconfiguration would be a very long and costly operation. In such situations, according to alternative embodiments of the present invention, at least some of the method steps are carried out by dedicated computers connected to the nodes, as it will be described in detail herein after.

According to a first alternative embodiment, the transmitting node N1 is preferably connected to a first computer through a port different from the port through which the packet flow PF is transmitted. Similarly, the receiving node N2 is preferably connected to a second computer PC2 through a port different from the port through which the packet flow PF is received. According to this first implementation, the node N1 marks the packets Pki for dividing the packet flow PF in blocks and for identifying packets to be subjected to time measurement, while the time measurement is performed by the computers PC1, PC2 on copies of the real traffic transmitted in the communication network CN. A marking functionality already available at the node N1 may be exploited for supporting the time measurement performed by the computers PC1, PC2. Advantageously, in case one of the PCs is failed, only the time measurement is affected, whereas transmission of the packet flow PF is unaffected.

According to a second alternative embodiment, the transmitting node N1 is preferably connected to a first computer PC1 through the same port through which the packet flow PF is transmitted. Similarly, the receiving node N2 is preferably connected to a second computer PC2 through the same port through which the packet flow PF is received. In other words, the first computer PC1 and the second computer PC2 are pass-through probes located on the path followed by the packet flow PF between the transmitting node N1 and the receiving node N2. According to this second alternative embodiment, the first computer PC1 is configured to perform all the steps of the flow charts of FIGS. 3a and 3b, while the second computer PC2 is configured to perform all the steps of the flow charts of FIGS. 4a and 4b. In other words, according to this second alternative embodiment, the nodes N1, N2 do not perform any operation supporting the time measurement, which is completely in charge to the computers PC1, PC2. The computers PC1, PC2 basically implements all the traffic processing functions of a node, plus the packet loss and time measurements functions. Hence, the time measurement may be implemented independently of the functionalities available at the nodes N1, N2. This allows implementing the time measurement on real traffic transmitted in communication networks comprising nodes of different types and different vendors.

Further, in the above description it has been assumed that the nodes N1, N2 transmit the respective calculated parameters (packet count and timestamp array) to the management server MS, which uses them for calculating the medium delay and medium jitter. According to alternative embodiments, the packet loss and time measurements may be carried out by one of the nodes N1, N2. Hence, assuming for instance that the calculation is performed by the receiving node N2, the transmitting node N1 shall transmit to the receiving node N1 the calculated parameters. Such parameters may be inserted in a dedicated packet, for instance an OAM frame. Hence, according to such embodiments, the calculation of time measurements relating to various packet flows is advantageously distributed at the nodes of the communication network CN.

The invention claimed is:

1. A method for performing a time measurement on a packet flow transmitted through a communication network from a first measurement point to a second measurement point, said method comprising:
   a) at said first measurement point, while said packet flow is transmitted, dividing said packet flow into first packets transmitted during first periods and second packets transmitted during second periods which alternate in time with said first periods;
   b) during a certain period, while said first packets are transmitted, marking said first packets by setting a feature of each one of said first packets to either a first marking value indicating a first packet to be subjected to time measurement or a second marking value indicating a first packet not to be subjected to time measurement, and at said first measurement point generating a transmission timestamp for each one of said first packets marked by said first marking value said marking comprising:
      setting a predefined minimum inter-transmission time shorter than a duration of said period, and
      checking whether said minimum inter-transmission time lapsed since transmission of the last packet marked by said first marking value and, when the minimum inter-transmission time lapses, marking said first packet by said first marking value on or after lapse of the minimum inter-transmission time;
   c) at said second measurement point, identifying said first packets marked by said first marking value and, for each one of said first packets marked by said first marking value, generating a reception timestamp;
   d) after expiration of said period, performing said time measurement based on said transmission timestamps and said reception timestamps of said first packets marked by said first marking value.

2. The method according to claim 1, wherein said step a) comprises marking said packets by setting a further feature of each one of said packets to either a third marking value indicating a first packet to be transmitted during said first periods or a fourth marking value indicating a second packet to be transmitted during said second periods.

3. The method according to claim 2, wherein each packet of said packet flow comprises a marking field, a first marking sub-field of said marking field and said feature being a second marking sub-field of said marking field.

4. The method according to claim 1, wherein said minimum inter-transmission time is longer than an average one-way delay of said packet flow from said first measurement point to said second measurement point.

5. The method according to claim 1, wherein said minimum inter-transmission time is longer than a maximum one-way delay of said packet flow from said first measurement point to said second measurement point.

6. The method according to claim 1, wherein said minimum inter-transmission time is longer than or equal to 10 milliseconds.

7. The method according to claim 1 wherein said step b) comprises, upon transmission of each one of said first packets:
   checking whether said certain period is one of said first periods or one of said second periods; and
   if said certain period is one of said first periods, increasing a transmission counter, checking whether said minimum inter-transmission time lapsed since transmission of the last packet marked by said first marking value and, in the affirmative, marking said first packet by said first marking value and setting one of a number of transmission timestamp variables to a current time indicated by a local clock of said first measurement point.

8. The method according to claim 7, wherein said step d) comprises:
   checking whether said period was one of said first periods or one of said second periods;
   if said period was one of said first periods, using said transmission counter and said number of transmission timestamp variables for performing said time measurement; and
   resetting said transmission counter and said number N of transmission timestamp variables.

9. The method according to claim 7 wherein said step c) comprises, upon reception of each packet:
   checking whether said packet is one of said first packets or one of said second packets;
   if said packet is one of said first packets, increasing a reception counter, checking whether said first packet is marked by said first value and, in the affirmative, setting one of a number of reception timestamp variables to a current time indicated by a local clock of said second measurement point.

10. The method according to claim 9, wherein said step d) comprises:
    checking whether said period was one of said first periods or one of said second periods;
    if said period was one of said first periods, using said reception counter and said number of reception timestamp variables for performing said time measurement; and
    resetting said reception counter and said number of reception timestamp variables.

11. The method according to claim 10, wherein said step d) is delayed, relative to the end of said period, by a predetermined wait time comprised between 1% and 50% of a duration of said period.

12. The method according to claim 1, wherein said step d) comprises calculating a one-way delay for each one of said first packets marked by said first marking value as a difference between transmission timestamp and reception timestamp generated at step c) for said first packet.

13. A non-transitory computer readable medium encoded with computer-readable instructions that, when executed by a computer, cause the computer to perform the method of claim 1.

14. A node for a communication network, said node being configured to transmit a packet flow to a further node, the node comprising at least a computer and memory, said node being configured to:
    a) while said packet flow is transmitted, divide said packet flow into first packets transmitted during first periods and second packets transmitted during second periods which alternate in time with said first periods;
    b) during a certain period, while said first packets are transmitted, mark said first packets by setting a feature of each one of said first packets to either a first marking value indicating a first packet to be subjected to time measurement or a second marking value indicating a first packet not to be subjected to time measurement, and for each one of said first packets marked by said first marking value generating a transmission time-stamp, said marking comprising:

setting a predefined minimum inter-transmission time shorter than a duration of said period, and checking whether said minimum inter-transmission time lapsed since transmission of the last packet marked by said first marking value and, when the minimum inter-transmission time lapses, marking said first packet by said first marking value on or after lapse of the minimum inter-transmission time.

* * * * *